Aug. 10, 1926.

1,595,771

J. R. GARDINER

AGRICULTURAL IMPLEMENT

Filed Oct. 29, 1923

INVENTOR.
John R. Gardiner

BY R. L. Smith

ATTORNEY.

Patented Aug. 10, 1926.

1,595,771

UNITED STATES PATENT OFFICE.

JOHN R. GARDINER, OF FULLERTON, CALIFORNIA.

AGRICULTURAL IMPLEMENT.

Application filed October 29, 1923. Serial No. 671,354.

This invention is an agricultural implement of the type comprising a vehicular support for a frame having a ground working element depending therefrom; and in which the draft pull upon the implement is utilized for elevating the frame for the ground working element relative to the vehicle supporting the same, so as to disengage the tool blade from the ground.

It is the object of the invention to provide a simple but efficient clutch connection adapted to elevate the tool by the turning of the wheels of the vehicle, said clutch connection being normally maintained in inoperative position without the use of yieldable means such as springs, and also having extremely simple means for disengaging said clutch connection when the tool has been elevated.

It is a further object of the invention to automatically lock the frame of the tool in elevated position, and to provide a single control mechanism for engaging the clutch to elevate the tool, and also adapted to release the automatic lock, after the frame has been elevated and it is desired to again lower the tool.

It is a still further object of the invention to provide adjustable means for limiting lowering of the frame relative to the vehicular support, so as to regulate the depth to which the tool blade will enter the ground; said regulating means being controlled from the front of the implement at a point convenient to the operator.

It is a still further object of the invention to form the vehicle frame of a crank shaft having ground wheels mounted on the ends thereof, with the frame for the earth working element journaled at its upper side to the crank pin portion of the shaft, so that the tool frame and blade carried thereby will have the desired range of vertical movement by minimum turning of the crank shaft, thus affording a quick raising and lowering of the tool and also eliminating excessive movement of the operating parts during actuation thereof.

As a practical embodiment, the invention is illustrated as applied to a sub-soiler, it being understood, however, that any type of ground working element may be carried by the tool frame, and that if desired, said ground working tools may be interchangeably connected to the frame in any usual manner.

In the accompanying drawings.

Figure 1:
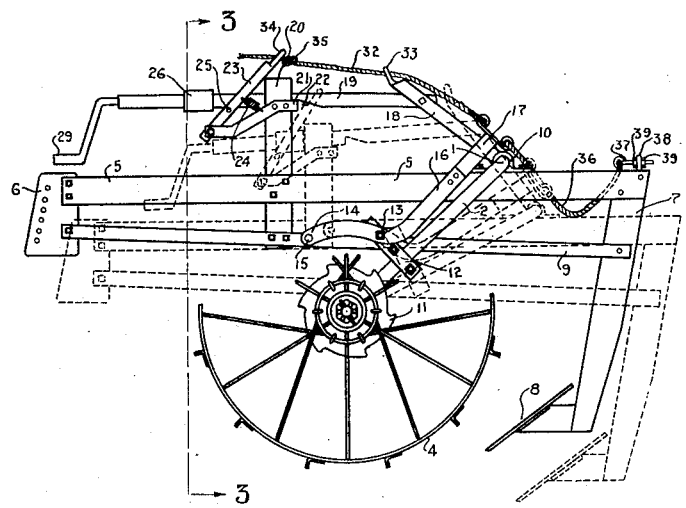
Fig. 1 is a side elevation of the implement in elevated position, and showing the same in lowered position by dotted lines.
Figure 2:
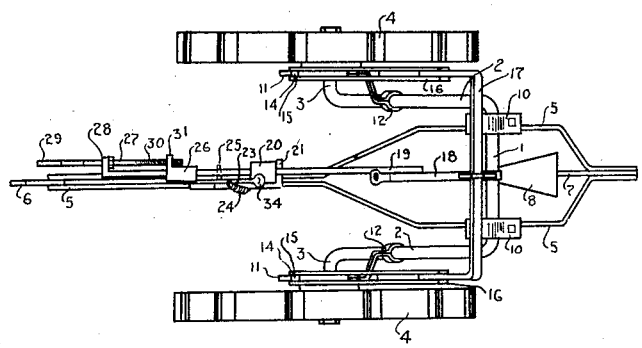
Fig. 2 is a plan view of the implement.
Figure 3:
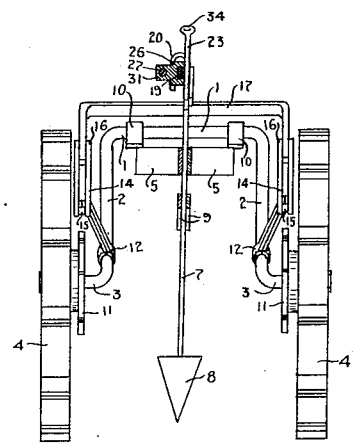
Fig. 3 is a section on the line 3—3 of Fig. 1.

The supporting vehicle of the implement comprises a crank shaft having crank pin 1, crank arms 2 at the ends thereof, and stub shafts 3 at the ends of said crank arms, with ground wheels 4 mounted on said stub shafts.

The frame for the earth working element is formed of longitudinally extending beams 5 transversely spaced at their medial portions, and having a draft connection 6 at their front ends. The earth working tool is supported at the rear ends of said beams, and in the present instance showing said tool as a sub-soiler, the support 7 of said sub-soiler depends from the rear ends of beams 5 and is provided with a usual sub-soiler blade 8 at the lower end thereof. Braces 9 preferably connect the support 7 and the draft connection 6.

The frame for the earth working tool is carried by the vehicular support, by means of bearing blocks 10 on the upper sides of beams 5 having crank pin 1 journaled therein, with crank arms 2 extending downwardly at the respective sides of the tool frame, so that turning of the crank shaft will raise and lower the frame to disengage or engage blade 8 in the earth.

The mechanism for turning the crank shaft comprises ratchet discs 11 fixed to ground wheels 4, and clutch mechanism carried by the crank shaft adapted to engage said ratchet discs.

As an instance of this arrangement blocks 12 are mounted on crank arms 2 in spaced relation from crank pin 1, said blocks projecting forwardly from the crank arms and having clutch levers pivoted to the outer ends thereof. The clutch levers are pivoted at medial points 13 to blocks 12, the front ends 14 of said levers curving forwardly and then downwardly, with rollers 15 adapted to engage ratchet discs 11, journaled at the ends thereof; and the rear ends 16 of said clutch levers curving upwardly and having a transverse bridle 17 connecting the same above the tool frame, and forming an actuating member for swinging said clutch levers so as to engage or disengage rollers 15 with the ratchet discs 11.

It will be noted that the positioning of bearing blocks 10 at the upper sides of beams 5, permits the desired vertical movement of the tool frame by a relatively short turning movement of the crank shaft, and that the particular arrangement of the clutch mechanism as described, provides for operation thereof by a relatively short swinging movement of bridle 17, thereby affording a quick raising and lowering of the tool frame by minimum movement of the actuating mechanism.

The mechanism for locking the tool frame in elevated position, and subsequently releasing the same and limiting lowering of the frame, includes an arm 18 fixed to crank pin 1 and projecting forwardly therefrom, with a locking arm 19 pivoted at its rear end to arm 18 and extending to the front of the tool frame through a guide 20 mounted on beams 5.

Guide 20 is provided with a cross bar 21 adapted to engage a notch 22 in arm 19, when the tool frame has been moved to elevated position and said arm has been shifted forward by turning of arm 18 with the crank shaft. The tool frame is thus locked in its elevated position until subsequent swinging of arm 19 so as to disengage bar 21 from notch 22, said releasing of the locking arm being effected by a lever 23 normally retracted by a spring 24, and having an abutment 25 adapted to engage arm 19 for releasing the same, when said lever is swung forward.

Upon release of locking arm 19, the weight of the tool frame will cause reverse turning of the crank shaft so as to relower said frame, the lowering of the frame being limited by a stop 26 on arm 19 in front of and adapted to abut against guide 20.

The stop is slidably adjustable along arm 19 so as to regulate the depth to which blade 8 will enter the ground, the control for adjusting said stop being at the front end of arm 19 where it is convenient to the operator of the implement.

As an instance of this arrangement, a shaft 27 is journaled alongside arm 19 in a bearing 28, and is provided with a crank handle 29 at its forward end projecting beyond said arm, and is threaded at its rear end as shown at 30, for engaging a nut 31 projecting laterally from stop 26.

A single control mechanism extending forwardly to a point convenient to the operator of the implement, is adapted to swing the clutch mechanism into operative position for elevating the tool frame, and also subsequently actuate lever 23 for releasing the locking means and permitting relowering of the tool frame.

For this purpose a flexible cable 32 is fixed to bridle 17, and extends through eyes 33 and 34 on the ends of arm 18 and lever 23 respectively, said cable being of a length adapted to extend forward to a point convenient to the operator of the implement, so that a pull upon the cable will swing bridle 17 for engaging the clutch mechanism and elevating the tool frame.

The cable is provided with an abutment shown as a knot 35, in rear of the eye 34 in lever 23, and spaced therefrom when the cable is slack and the clutch mechanism is in inoperative position, the parts being so arranged that after elevation of the tool frame and disengagement of the clutch mechanism, as will be hereinafter described, the knot 35 will be adjacent eye 34, so that a sharp pull upon the cable will cause the knot to abut against said eye, for swinging lever 23 and thereby releasing the locking mechanism as previously described.

The mechanism for automatically disengaging the clutch mechanism when the tool frame is elevated, comprises a flexible cable 36 fixed to bridle 17 at its forward end and having its rear end adjustably connected to the rear of the tool frame, as by a bolt 37 connected to said cable and slidable through an eye 38 carried by the frame, with adjusting nuts 39 threaded on the bolt at the respective sides of the eye.

The cable is adjusted in length by turning nuts 39, so that it will be slack when bridle 17 is swung rearwardly for disengaging the clutch mechanism, and will continue to be slack when the bridle is swung forward to engage the clutch mechanism, until the crank shaft has turned sufficiently to elevate the tool frame, at which time the forward swinging of bridle 17 with the turning crank shaft, will draw cable 36 taut and thus pull upon the bridle so as to swing it rearwardly and thereby disengage the clutch mechanism.

It will be apparent that various changes may be made in the construction, combination, and arrangement of parts as thus described, without departing from the spirit of the invention.

What is claimed is:

1. An agricultural implement comprising a crank axle, a tool frame journaled on the crank pin of the axle, a ground wheel journaled on the crank arm of the axle, a clutch comprising elements carried by the ground wheel and the crank axle respectively and adapted to lock the ground wheel to the crank axle to rock the axle and elevate the tool frame by turning of the ground wheel, means for engaging the clutch secured to the clutch element which is carried by the crank axle at a point removed from the axis of the crank pin, a latch for securing the tool frame in elevated position, means for releasing said latch, and an abutment on the clutch engaging means moved into a position for operatively engaging the releasing means by rocking of the crank axle.

2. An agricultural implement comprising a crank axle, a tool frame journaled on the crank pin of the axle, a ground wheel journaled on the crank arm of the axle, a clutch comprising elements carried by the ground wheel and the crank axle respectively and adapted to lock the ground wheel to the crank axle to rock the axle and elevate the tool frame by turning of the ground wheel, means for engaging the clutch secured to the clutch element which is carried by the crank axle at a point removed from the axis of the crank pin, a lost motion connection between the clutch engaging means and tool frame operative to release the clutch by movement of the clutch engaging means with the crank axle relative to the tool frame, a latch for securing the tool frame in elevated position, means for releasing said securing means, and an abutment on the clutch engaging means moved into a position for operatively engaging the releasing means by said movement of the engaging means with the crank axle.

3. An agricultural implement comprising a crank axle, a tool frame journaled on the crank pin of the axle, a ground wheel journaled on the crank arm of the axle, a clutch element on the ground wheel, a lever on the crank axle adapted to engage said clutch element for locking the ground wheel to the axle to rock the axle and elevate the tool frame by turning of the ground wheel, an arm mounted on the crank axle, a link connected to said arm, means on the tool frame for engaging the link to hold the tool frame in elevated position, a lever for releasing the link from said engaging means, and an operating connection for the clutch lever fixed thereto at a point removed from the axis of the crank pin and having an abutment moved into a position for operatively engaging the releasing lever by rocking of the crank axle.

4. An agricultural implement comprising a crank axle, a tool frame journaled on the crank pin of the axle, a ground wheel journaled on the crank arm of the axle, a clutch element on the ground wheel, a lever on the crank axle adapted to engage said clutch element for locking the ground wheel to the axle to rock the axle and elevate the tool frame by turning of the ground wheel, an arm mounted on the crank axle, a link connected to said arm, a guide on the tool frame for engaging the link to hold the tool frame in elevated position, a lever for releasing the link from said guide, an operating connection for the clutch lever fixed thereto at a point removed from the axis of the crank pin and having an abutment moved into a position for operatively engaging the releasing lever by rocking of the crank axle, and a stop on the link adapted to engage said guide for limiting lowering of the tool frame.

In testimony whereof I have affixed my signature to this specification.

JOHN R. GARDINER.